(12) United States Patent
Feng et al.

(10) Patent No.: US 8,700,418 B2
(45) Date of Patent: Apr. 15, 2014

(54) METHOD AND SYSTEM FOR ACQUIRING HIGH QUALITY NON-EXPERT KNOWLEDGE FROM AN ON-DEMAND WORKFORCE

(75) Inventors: Donghui Feng, Glendale, CA (US); Sveva Besana, Los Angeles, CA (US); Remi Zajac, Pasadena, CA (US)

(73) Assignee: Yellowpages.com LLC, Glendale, CA (US)

( * ) Notice: Subject to any disclaimer, the term of this patent is extended or adjusted under 35 U.S.C. 154(b) by 1126 days.

(21) Appl. No.: 12/639,915

(22) Filed: Dec. 16, 2009

(65) Prior Publication Data

US 2011/0145156 A1    Jun. 16, 2011

(51) Int. Cl.
*G06Q 10/00* (2012.01)

(52) U.S. Cl.
USPC ............... 705/1.1; 705/7.12; 705/37; 705/53

(58) Field of Classification Search
USPC ..................... 705/1.1, 37, 53, 7.12
See application file for complete search history.

(56) References Cited

U.S. PATENT DOCUMENTS

| | | | |
|---|---|---|---|
| 2003/0187664 A1* | 10/2003 | Bonebrake | 705/1 |
| 2004/0167787 A1* | 8/2004 | Lynch et al. | 705/1 |
| 2005/0244799 A1* | 11/2005 | Skenandore | 434/238 |
| 2008/0070206 A1* | 3/2008 | Perilli | 434/219 |
| 2008/0071600 A1* | 3/2008 | Johnson | 705/9 |
| 2008/0147797 A1* | 6/2008 | Ramaswamy et al. | 709/204 |
| 2009/0099887 A1* | 4/2009 | Sklar et al. | 705/7 |
| 2010/0178645 A1* | 7/2010 | Ieperen et al. | 434/323 |
| 2011/0035323 A1* | 2/2011 | Hamilton et al. | 705/301 |

OTHER PUBLICATIONS

Frank Kleemann and G. Günter Voβ (Technical University Chemnitz) with Kerstin Rieder (FH Nordwestschweiz); Un(der)paid Innovators: The Commercial Utiliza-tion of Consumer Work through Crowdsourcing; Jul. 1, 2008; Science, Technology & Innovation Studies vol. 4, No. 1.*

* cited by examiner

*Primary Examiner* — Jami A Plucinski
*Assistant Examiner* — Fathi Abdelsalam
(74) *Attorney, Agent, or Firm* — Kilpatrick Townsend & Stockton LLP (57) ABSTRACT

Systems and computer-implemented methods include a validation phase in which validation projects are submitted to an online crowdsourcing system. The validation projects each have different combinations of the two validation control parameters, payment per human intelligence task ("HIT") and number of solutions per HIT. By analyzing the solutions for the validation projects, final control parameters can be selected from the validation project having the best combination of high quality, low cost, and short time to completion. The final control parameters can be submitted along with a final project to the online crowdsourcing system. In addition, a novel outlier detection algorithm enables the system to detect outlier workers based on the distribution of non-experts' agreement probabilities, reject outlier workers' results, and thus save labeling cost.

20 Claims, 4 Drawing Sheets

METHOD AND SYSTEM FOR ACQUIRING HIGH QUALITY NON-EXPERT KNOWLEDGE FROM AN ON-DEMAND WORKFORCE

FIELD OF THE TECHNOLOGY

Embodiments of the disclosure relate to using online crowdsourcing systems to co-ordinate the use of human intelligence to complete projects which computers cannot do effectively.

BACKGROUND

Some analysis projects are better performed by expert humans ("experts") than by computers. For instance, labeling website photos or selecting the most representative photos from a large database of photos are projects that experts are more effective at completing than computers. As another example web search companies can use experts to test the effectiveness of search engines and do quality control experiments. Experts can also be useful in, for example, writing product descriptions or splitting up audio files. Other categories where experts are more useful than computers include catalogue and data management, search optimization, database creation, and content management. However, using experts can be very expensive and time consuming.

One solution is to use a crowdsourcing service or system. Crowdsourcing services and systems provide online marketplaces where businesses and other entities can submit projects that are best completed by experts. Yet, instead of experts working on the projects, hundreds of online workers or "online non-experts" complete the projects. These crowdsourcing systems decrease the time and cost of a project while only marginally decreasing the work product as compared to what an expert could accomplish (and in some cases producing a better work product than what experts are capable of). The idea is that tens, hundreds, or thousands of non-experts can do the job of an expert for a fraction of the cost and in a fraction of the time. The businesses or other entities are called "requesters," and the requesters submit projects to a website of any one of the crowdsourcing services.

SUMMARY OF THE DESCRIPTION

Systems and methods to use online crowdsourcing systems are described herein. Some embodiments are summarized in this section.

In one embodiment, when a project is submitted to an online crowdsourcing system, the project can include two control parameters: payment per human intelligence task ("HIT") and number of solutions per HIT. Examples of solutions are the labels, photos, answers, files, or any other human input that the online non-workers provide in order to complete a HIT. One or more online non-experts can be assigned to the same HIT, and this duplicative work is expected to improve the quality of completed HITs.

Some embodiments seek to select these control parameters such that the project, or a final project, is completed with high accuracy ("quality"), at low cost, and in a short period of time. To do this a validation phase can be used before the final project is submitted. The validation phase tests small batches of HITs ("validation projects"), where each batch uses a different combination of the two control parameters ("validation control parameters"). The validation phase uses the solutions that online non-experts provide for each validation project, to select final control parameters. The final control parameters are used with a final project. The final control parameters are selected based on the likelihood that they will result in a final project completed with high quality, at low cost, and in a short period of time.

In an embodiment, a computing system comprises a validation module and a submission module. The validation module includes the following sub modules: a submit validation project sub module; a quality sub module; a cost sub module; a time sub module; and a selection sub module. The submit validation project sub module is configured to submit validation projects to an online crowdsourcing system. Each validation project has one or more HITs and has two validation control parameters. The two validation control parameters are: a payment per HIT and a number of solutions per HIT. The quality sub module is configured to compute an agreement probability of each validation project. The agreement probability is a percentage of solutions that match references. The cost sub module is configured to compute a cost of each validation project. The time sub module is configured to compute a time that each validation project takes to complete. The selection sub module is configured to identify an eligible validation project from the validation projects. The eligible validation project meets a goal. The selection sub module also is configured to select two validation control parameters from the eligible validation project to be two final control parameters. The submission module is configured to submit a final project along with the two final control parameters to the online crowdsourcing system.

In another embodiment, a computer-implemented method includes providing, via a computing device, validation projects to online non-experts via an online crowdsourcing system. Each validation project has one or more HITs and has values for the following two validation control parameters: a payment per HIT and a number of solutions per HIT. The computer-implemented method also includes computing, via a computing device, an agreement probability of each validation project. The agreement probability is a percentage of solutions that match reference solutions. The computer-implemented method also includes computing, via a computing device, a cost of each validation project. The computer-implemented method also includes computing, via a computing device, a time that each validation project takes to complete. The computer-implemented method also includes identifying one of the validation projects as an eligible validation project. The eligible validation project has a lowest cost, a lowest time, and a highest quality. The computer-implemented method also includes selecting the values for the two validation control parameters of the eligible validation project as the final control parameters. The computer-implemented method also includes submitting, via a computing device, a final project to the online crowdsourcing system. The final project includes the two final control parameters.

In another embodiment, a computing system includes a validation module and a final submission module. The validation module includes a provide module, an access module, and a selection module. The provide module is configured to provide one or more instances of a validation project to an online crowdsourcing system. Each instance of the validation project includes different values of the following validation control parameters: payment per HIT and number of solutions per HIT. The access module is configured to access completed instances of the validation project via the online crowdsourcing system. The selection module is configured to select final control parameters from one of the completed instances of the validation project, where the one of the completed instances of the validation project meets a quality-cost-time algorithm. The final submission module is configured to submit a final project to the online crowdsourcing system. The final project uses the final control parameters.

Other embodiments and features of the present invention will be apparent from the accompanying drawings and from the detailed description which follows.

BRIEF DESCRIPTION OF THE DRAWINGS

The embodiments are illustrated by way of example and not limitation in the figures of the accompanying drawings in which like references indicate similar elements.

DETAILED DESCRIPTION

The following description and drawings are illustrative and are not to be construed as limiting. Numerous specific details are described to provide a thorough understanding. However, in certain instances, well known or conventional details are not described in order to avoid obscuring the description. References to one or an embodiment in the present disclosure are not necessarily references to the same embodiment; and, such references mean at least one.

A crowdsourcing system is an internet-based marketplace where computing systems can be used to co-ordinate the inputs of large numbers of human workers called "online non-experts" in order to complete projects requiring human input. Each project is broken into human intelligence tasks ("HITs"), and each online non-expert completes one or more HITs by providing a solution to the one or more HITs. Requesters pay online non-experts for each completed HIT or solution. For the purposes of this disclosure, the amount paid for each completed HIT will be referred to as "payment per HIT." The payment per HIT is a value that controls how much online non-experts are paid for each completed HIT or solution. A solution can include, for example, a label, a description, an online action, a selection, or any other online non-expert input required to complete a HIT. Nor do solutions need to be limited to common computer inputs such as keystrokes and mouse movements. A solution can include a voice recording of an online non-expert singing a song or describing the qualities of a product, for example. A solution can include, for example, a picture that an online non-expert provides from a camera or personal image database. It should be understood that solutions encompass a broad range of inputs including at least any solution that a requester conceives of.

Since online non-experts can produce different solutions when faced with the same HIT (e.g., providing slightly different solutions for the same photo or splitting an audio file at slightly different points), identical HITs can be assigned to multiple online non-experts. Solutions that stray from the majority or stray too far from solutions provides by experts are deemed outliers and can be removed. In other words, assigning multiple online non-experts to the same HIT improves the quality of the results. For the purposes of this disclosure, the number of online non-experts assigned to each HIT will be referred to as a "number of solutions per HIT," since each online non-expert provides one solution per HIT. The number of solutions per HIT is a value that controls how many online non-experts must complete the same HIT in order for the HIT to be completed. For instance, if the HIT involves finding the address of a small-town courthouse, and the number of solutions per HIT is five, then five online non-experts will need to provide an address for the courthouse before the task has been completed.

Quality measures the accuracy of online non-expert solutions compared to expert solutions. If the quality is low, then requesters may not place as much trust in projects completed via crowdsourcing and they may revert to using experts. Thus, maintaining high quality ensures the usefulness of crowdsourcing as an alternative to using experts. An expert is a trained human who completes the same HITs as the online non-experts. Quality can be measured as an agreement probability. The agreement probability represents the correlation between HITs completed by online non-experts and HITs completed by experts. For instance, if online non-experts and experts are asked to complete a project, and the online non-experts provide the same solutions as the experts 80% of the time, then the quality or agreement probability is 80%.

Figure 1:
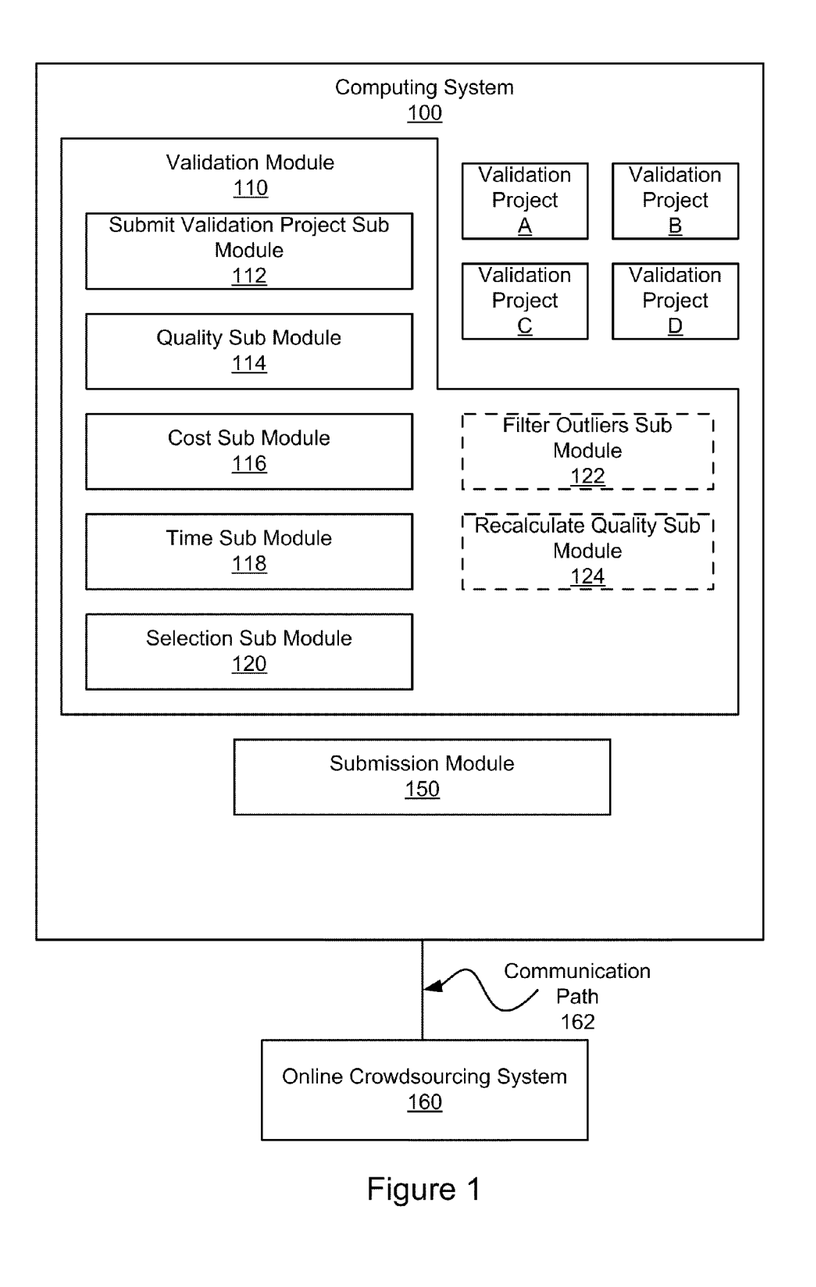
FIG. 1 illustrates an embodiment of a computing system configured to select final control parameters to be submitted along with a final project to an online crowdsourcing system.

FIG. 1 illustrates an embodiment of a computing system 100 configured to select final control parameters to be submitted along with a final project to an online crowdsourcing system 160. The computing system 100 operates in two phases: first a validation phase and then a final submission phase. The validation phase is carried out via a validation module 110 and its sub modules 112, 114, 116, 118, 120. The submission phase is carried out via a submission module 150. The validation module 110 is configured to select values for two final control parameters, payment per HIT and number of solutions per HIT, that are predicted to, when submitted with a final project to an online crowdsourcing system 160, result in a completed project at minimal cost, in minimal time, and with maximum quality. The validation module 110 does this by submitting small test batches of HITs, or validation projects, to the online crowdsourcing system. Each batch of HITs, or validation projects, uses a different combination of two "validation control parameters": payment per HIT and number of solutions per HIT. Online non-experts complete the HITs in the form of solutions. The solutions are compared to references. The references can include solutions provided by experts or solutions provided by online non-experts. Based on the comparison, agreement probabilities are computed. Agreement probabilities indicate the likelihood that an online non-expert will produce the same solution for a HIT as an expert would. In other words, the agreement probability is a percentage of solutions that match references. A cost and time for each validation project can also be computed. By analyzing the distribution of the agreement probabilities, along with the cost and time for each validation project, the validation module 110 can predict which combination of validation control parameters, when submitted with a project to the online crowdsourcing system 160, will likely result in a completed project that was completed with high quality, quickly, and inexpensively. To do this the validation module 110, in an embodiment, includes a submit validation project sub module 112, a quality sub module 114, a time sub module 116, a cost sub module 118, a selection sub module 120, a filter outlier sub module 122, and a recalculate quality sub module 124. Once the validation module 110 selects two final control parameters from the validation control parameters, the two final control parameters can be submitted, along with a final project, to the online crowdsourcing system 160.

In an embodiment, the submit validation project sub module 112 is configured to submit validation projects to the online crowdsourcing system 160. Each validation project is submitted with two validation control parameters: a payment per HIT and a number of solutions per HIT. Since these two control parameters are submitted in the validation phase, they are referred to as validation control parameters. No two validation projects have the same combination of validation control parameters. Take the illustrated embodiment for example. There are four validation projects, A, B, C, and D. Validation project A may pay $0.01 per HIT and may require five online non-experts per HIT; validation project B may pay $0.01 per HIT and may require ten online non-experts per HIT; validation project C may pay $0.05 per HIT and may require five online non-experts per HIT; and validation project D may pay $0.05 per HIT and may require ten online non-experts per HIT. These illustrative values show how each validation project can have a different combination of the two validation control parameters.

Submitting a validation project to the online crowdsourcing system 160 can be done through an online crowdsourcing system website. The requester can submit a validation project to the online crowdsourcing system 160 via the Internet, and the online crowdsourcing system's software can distribute the HITs of the validation project (or make them available) to online non-experts via the Internet.

In an embodiment, validation control parameters are selected by the requester. The requester selects a range of values for the payment per HIT and a range of values for the number of solutions per HIT. The requester selects a number of validation projects for each validation control parameter. For instance, the requester can select three validation projects for the payment per HIT and five validation projects for the number of solutions per HIT validation. The validation module 110 then divides the ranges of the validation control parameters up based on the number of validation projects selected for each validation control parameter. For instance, assume that the requester selects the range of payments per HIT to be $0.01 to $0.09 and the range of the number of solutions per HIT to be 1 to 5. Assume also that the requester indicates three validation projects for the payment per HIT and five validation projects for the number of solutions per HIT. The payment per HIT values would be $0.01, $0.05, and $0.09, and the number of solutions per HIT would be 1, 2, 3, 4, and 5. Each of the resulting fifteen validation projects would have one combination of the fifteen possible combinations of the two validation control parameters.

In an embodiment, validation control parameters are automatically or randomly selected by the validation module 110. The validation module 110 selects a range of values for the payment per HIT and a range of values for the number of solutions per HIT. The validation module 110 selects a number of validation projects for each validation control parameter. The validation module 110 then divides the ranges of the validation control parameters up based on the number of validation projects for each validation control parameter.

In addition to the two preceding embodiments, other embodiments fall within a spectrum between those two. In this spectrum of embodiments, the requester and the validation module both perform some aspects of selecting validation control parameters. As the requester provides more input, the validation module 110 performs less of the selecting functions.

Once validation projects are submitted to the crowdsourcing system 160, the online non-experts complete the validation projects and provide solutions. Each completed validation project includes a plurality of completed HITs. Each completed HIT includes one solution provided by one online non-expert. The quality sub module 114 computes an agreement probability for each validation project. The agreement probability measures the likelihood that online non-experts will provide the same solution for a HIT as an expert would have. The agreement probability is computed as a percentage of solutions, for a given validation project, that match references. In an embodiment, the agreement probability is an aggregate of all the solutions provided for a given HIT.

The references can be solutions provided by experts, solutions provided by other online non-experts, or a combination of the two. If the reference is solutions provided by experts, then one or more experts complete the same HITs that the online non-experts complete. By comparing solutions provided by the online non-experts to the solutions provided by the one or more experts an agreement probability can be determined to see the similarity between solutions provided by the online non-experts and solutions provided by the experts. If the reference is solutions provided by online non-experts, an agreement probability can be determined for each online non-expert relative to all other online non-experts who completed the same HIT. Assuming that the majority of online non-experts will provide the same solution as an expert would have, comparison to other online non-experts is another way to measure quality. In an embodiment, the reference can be a combination of these two.

In an embodiment, a cost sub module 116 computes the total cost of each validation project. Cost is computed by multiplying the payment per HIT times the number of solutions for a validation project. In other words, the total money that is paid to online non-experts for each validation project equals the cost of that validation project.

In an embodiment, a time sub module 118 computes a total time of each validation project. For example, the total time can be measured from the moment that a first online non-expert begins work on a first HIT to the moment that a solution to all HITs is submitted to the crowdsourcing system 160.

By analyzing a distribution of the agreement probabilities, along with the time and cost associated with each agreement probability, a selection sub module 120 selects two final control parameters for submission along with the final project. The final control parameters are selected from the validation control parameters. In an embodiment, this is done by predicting which combination of the two validation control parameters, when submitted with a final project to the online crowdsourcing system 160, will result in a completed project that was completed with high quality, in a short amount of time, and at low cost. This predicting is performed by comparing the quality, cost, and time of each validation project to a goal and selecting the validation control parameters for the validation project that meets the goal.

In an embodiment, the selection sub module 120 identifies a validation project that meets a goal or optimizes a goal, where the identified validation project is selected from the validation projects in one embodiment. A goal is a threshold, matrix, or algorithm that digitally represents the requester's priorities. For instance, in an embodiment, the goal is a quality-cost-time algorithm. The quality-cost-time algorithm is an algorithm that compares the quality, cost, and time for each validation project, with values that a requester has assigned for quality, cost, and time. In an embodiment, the quality-cost-time algorithm is a function of the quality, cost, and time, such as a weighted sum of indicators of quality and cost. The weighted sum computes a weighted total for each validation project by performing a weighted sum or a weighted average of the quality, cost, and time for each validation project. The validation project having the highest weighted sum or the highest weighted average can be identified as the eligible project. The weights are determined by the requester. This is one way that the eligible validation project is selected.

Once the eligible validation project is selected, the selection module 120 selects the two validation control parameters from the eligible validation project. These two validation control parameters are the final control parameters.

In an alternative embodiment, the goal is a quality-cost-time threshold. A quality-cost-time threshold is used to quantify a requester's priorities regarding quality, cost, and time. For instance, as the number of solutions per HIT is increased, the time and cost generally increase. Thus, a requester desiring greater quality may have to pay for it via money and time. As another example, as the payment per HIT increases, the cost and quality generally increase while the time generally decreases. Thus, a requester desiring greater quality and a faster project will have to pay for it via more money. These two non-limiting examples show that a requester cannot have his cake and eat it too. Quality, cost, and time sometimes have inverse relationships to each other. The quality-cost-time threshold is an electronic representation of the requester's priorities.

In an embodiment, the quality, cost, and time are compared to a quality-cost-time threshold. The quality-cost-time threshold has three threshold values: one for quality, one for cost, and one for time. When the quality-cost-time threshold is used, the selection sub module 120 compares the quality, cost, and time of each validation project to the quality-cost-time threshold. If a validation project meets the quality-cost-time threshold, then it is identified as the eligible validation project. If no validation project meets the quality-cost-time threshold, then the validation module 110 determines that the project should not be submitted to the online crowdsourcing system 160, and should instead be completed by experts.

In an embodiment, the quality, cost, and time are compared to a quality-cost-time matrix. The quality-cost-time matrix has multiple combinations of thresholds for quality, cost, and time. The combinations are analyzed in an order determined by the requester. If the selection sub module 120 cannot find a validation project that meets a first combination of thresholds, then the selection sub module 120 moves to a second combination of thresholds in the matrix. If the selection sub module 120 cannot find a validation project that meets the second combination of thresholds, then the selection sub module 120 moves to a third combination of thresholds, and so on. If no validation project meets any of the quality-cost-time thresholds in the matrix, then the validation module 110 determines that the project should not be submitted to the online crowdsourcing system 160, and should instead be completed by experts.

If a validation project meets the goal, then it is identified as an eligible validation project. From the eligible validation project, the two validation control parameters are selected to be the two final control parameters.

In an embodiment, the selection sub module 122 can analyze the agreement probabilities in terms of the control parameter, payment per HIT. In an embodiment, the selection sub module 122 can analyze the agreement probabilities in terms of the control parameter, number of solutions per HIT. In an embodiment, the selection sub module 122 can analyze the agreement probabilities in terms of both of the control parameters.

Once the selection sub module 120 selects the two final control parameters, the submission module 150 submits the final project along with the two final control parameters to the online crowdsourcing system 160. Note, that the final project is not the same as the validation projects mentioned earlier.

While validation projects use small batches of HITs in order to allow testing of different combinations of validation control parameters, the final project is submitted with the full number of HITs that the requester requires for the final project. The final project is likely to be far more expensive and time consuming than the validation projects. However, the final project is expected to be completed at high quality, at low cost, and in a short amount of time relative to a project submitted with control parameters selected without the benefit of a validation phase.

In an optional embodiment, the agreement probabilities are used to filter outliers via a filter outlier sub module 122. Outliers, or outlier solutions, are those solutions having an agreement probability lower than an outlier threshold. The outlier threshold is an agreement probability that all solutions must attain in order to avoid being deemed outlier solutions. The outlier threshold could be 55%, or 60%, or 65%, or 70%, for example The filter outlier sub module 122 can remove outlier solutions, reject outlier solutions, or deny access to outlier solutions. Removing outlier solutions means deleting them from a computer readable storage medium. Rejecting outlier solutions means that the computing system 100 does not or cannot access them through the crowdsourcing system 160. In this case the crowdsourcing system 160 can either block access to rejected outlier solutions or delete rejected outlier solutions from a computer readable storage medium. To deny access to outlier solutions means that the computing system 100 rather than the crowdsourcing system 160 blocks access to the outlier solutions. In an embodiment, rather than just remove, reject, or deny access to outlier solutions, all solutions provided by online non-experts who provided any outlier solutions can be removed, rejected, or blocked. An online non-expert can even be precluded from any future work for a given requester.

The filter outliers sub module 122 can also use an outlier algorithm. The outlier algorithm can be used to compare solutions to solutions provided by experts or to solutions provided by online non-experts. First, the outlier algorithm is discussed relative to a comparison to experts. The outlier algorithm first determines if each solution agrees with experts' solutions or the majority of the remaining non-experts' solutions. Based on the agreement of each individual solution, an agreement probability for each online non-expert is computed. This is done by finding the agreement probability for all solutions provided by a given online non-expert. Alternatively, a kappa coefficient can be used to determine the agreement probability for each online non-expert. The kappa coefficient is used to remove the effect of chance agreement, and is computed as follows:

$$\text{kappa} = \frac{P(A) - P(E)}{1 - P(E)}$$

where P(A) is the agreement probability for all solutions for a given online non-expert, and P(E) is the hypothetical probability of chance agreement. In other words, P(E) represents the degree of agreement if both annotators conduct annotations randomly (according to their own prior probability).

Based on the agreement probabilities for all of the online non-experts, an agreement probability distribution for the project can be created. The agreement probability distribution can then be analyzed to identify online non-experts having agreement probabilities that are lower than an outlier threshold. These online non-experts are called outlier online non-experts. All solutions provided by outlier online non-experts can be removed, rejected, or access to them can be denied.

```
DetectOutlier(P)
    for each online non-expert p ∈ P
        collect the label set L from p
        for each label l ∈ L
            /* compared with others' majority voting */
            compute its agreement probability with others
        compute P(A)_p (or kappa_p)
        analyze the distribution of P(A)
        return outlier online non-expert
```

Once outlier solutions are removed, quality, or agreement probabilities, can be recalculated via the recalculate sub module 124. If the filter outlier sub module 122 is not used, then the recalculate sub module 124 is not used.

The computing system 100 communicates with the online crowdsourcing system 160 via communication path 162. In an embodiment, the communication path 162 is a network such as the Internet or an intranet. The communication path 162 can be a wired path, a wired connection, or a combination of the two.

Figure 2:
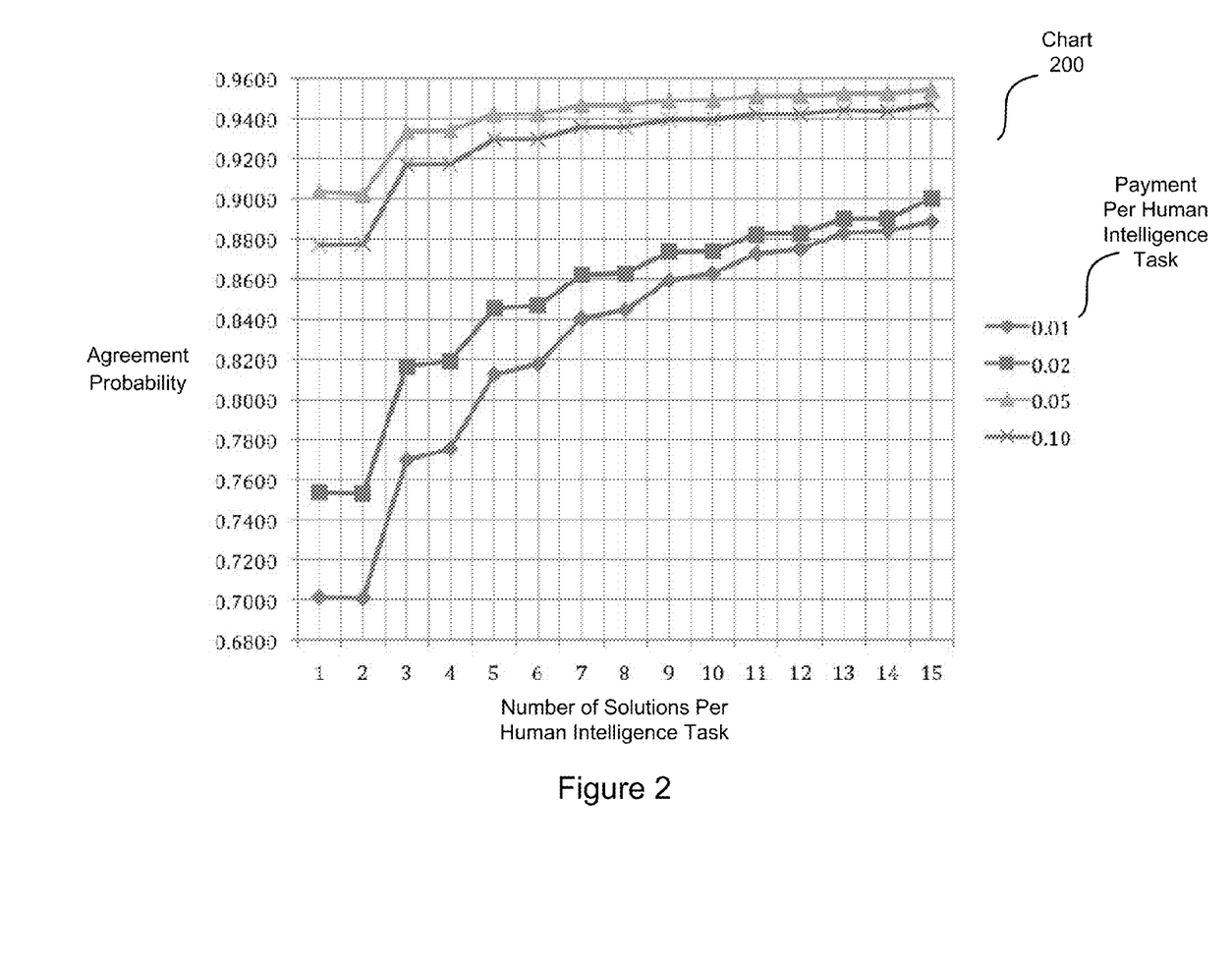
FIG. 2 illustrates a chart of agreement probabilities plotted in terms of payment per HIT and number of solutions per HIT.

FIG. 2 illustrates a chart 200 of agreement probabilities plotted in terms of payment per HIT and number of solutions per HIT. Each point on the chart 200 represents an agreement probability for a validation project. There are sixty agreement probabilities on the chart 200. Each validation project was submitted along with a payment per HIT ($0.01, $0.02, $0.05, or $0.10) and a number of solutions per HIT (1 to 15).

As the number of solutions per HIT increases, the agreement probability also increases. This shows that as more online non-experts work on the same HIT, the probability that their solutions will on average match those of solutions provided by experts increases. Hence, increased quality can be achieved by requiring more solutions per HIT. The tradeoff is that more solutions per HIT costs more money and takes longer.

As the payment per HIT increased, the agreement probability increases. Hence, increased quality can be achieved by paying online non-workers more money. Obviously, the tradeoff is that the quality comes at a price. However, interestingly, this rule breaks down when the payment per HIT is increased from $0.05 to $0.10. One possibility for this trend is that online non-experts put more effort into their HITs as they are paid more for each HIT, but at some point their tendency to work faster for more money begins to degrade the quality of their work. This observation shows that a validation phase can determine a payment per HIT near which increased payment per HIT is wasted or results in diminishing marginal returns. For the experiment plotted on the chart this payment per HIT value is near $0.05. It should be understood that this number is merely illustrative, and other values can also mark a point at which increased payment per HIT results in negligible increases in quality.

Figure 3:
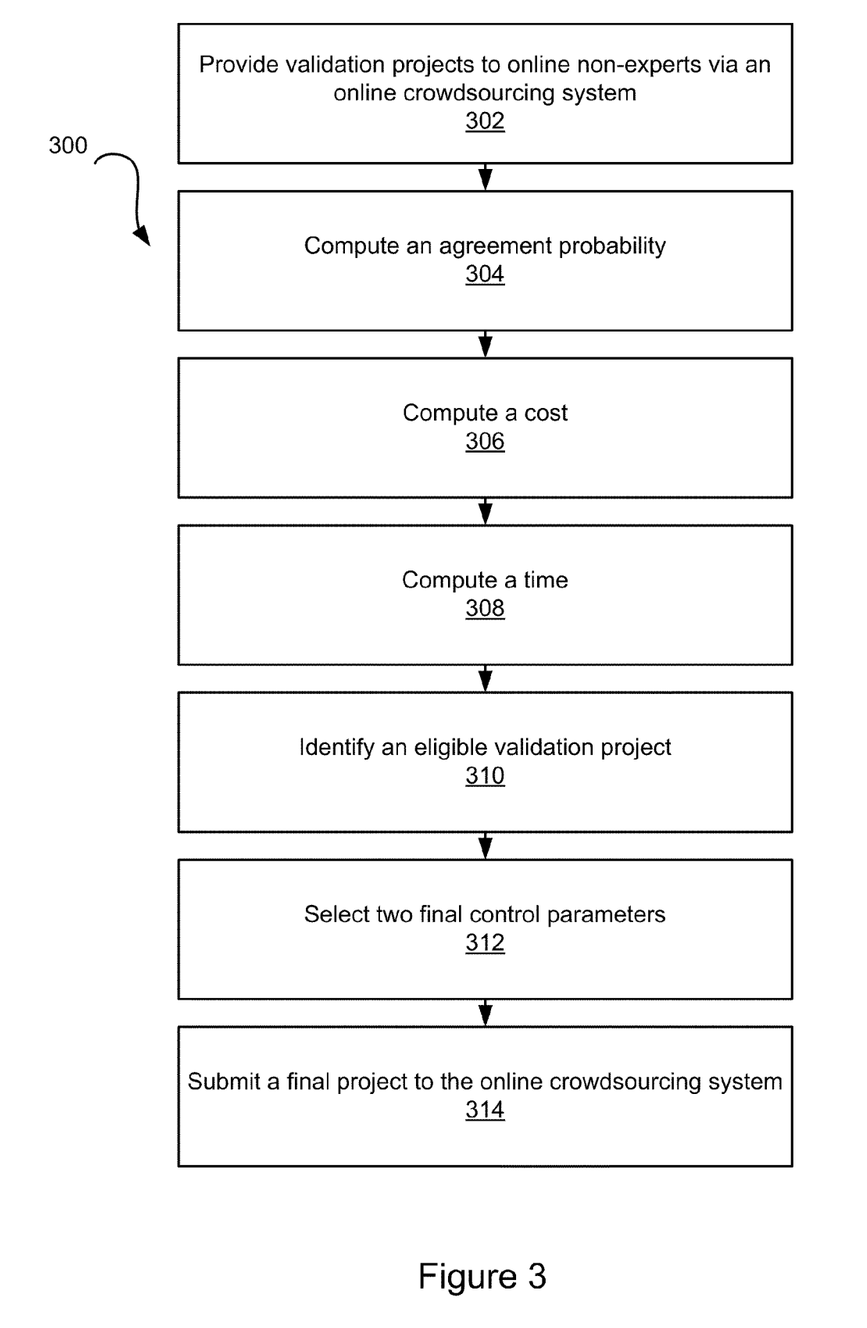
FIG. 3 illustrates an embodiment of a computer-implemented method for carrying out a validation phase and submitting a final project.

FIG. 3 illustrates an embodiment of a computer-implemented method 300 for carrying out a validation phase and submitting a final project. The method 300 includes a provide validation projects to online non-experts via an online crowdsourcing system operation 302. The method 300 includes a compute an agreement probability operation 304. The method includes a compute a cost operation 306. The method includes a compute a time operation 308. The method includes an identify an eligible validation project operation 310. The method includes a select two final control parameters operation 312. The method includes a submit final project to the online crowdsourcing system operation 314.

Validation projects are provided to online non-experts in the provide validation projects to online non-experts via an online crowdsourcing system operation 302. Each validation project has one or more HITs and has values for the following two validation control parameters: a payment per HIT and a number of solutions per HIT. The values are selected by the requester or by a computing system. Each validation project has a different combination of values for the two validation control parameters.

The online non-experts provide solutions to the HITs. In an optional embodiment, the method 300 includes rejecting solutions from outliers. In an embodiment, rejecting solutions means removing them from a computer readable storage medium. In an embodiment, rejecting solutions from outliers means denying or blocking electronic access to the solutions from outliers. In an embodiment, outliers are online non-experts that have provided a solution having an agreement probability that is lower than an outlier threshold. In an embodiment, outliers are online non-experts that have an agreement probability that is lower than the outlier threshold. In other words an agreement probability is computed for all non-experts that worked on the same project. Outliers and the outlier threshold have previously been defined in this disclosure.

The method 300 then computes an agreement probability of each validation project via the compute an agreement probability operation 304. The agreement probability is a percentage of solutions for a given validation project that match reference solutions. Reference solutions are solutions provided by experts or by other online non-experts. The agreement probability is thus the percentage of solutions that are the same as the solutions provided by an expert or by other online non-experts.

The method 300 also computes a cost and time for each validation project. The cost is computed via a compute a cost operation 306. The time is computed via a compute a time operation 308. The cost is the cost that each validation project takes to complete. The time is the time required for each validation project to be completed.

Once agreement probabilities, costs, and times are computed for each validation project, the method 300 identifies one of the validation projects as an eligible validation project. This is done in the identify an eligible validation project operation 310. The eligible validation project has a lowest cost, a lowest time, and a highest quality. In other words an algorithm or equation is used to identify which validation project has a preferred combination of cost, time and quality. By preferred it is meant that the requester indicates different levels of importance to cost, time, and quality, and the algorithm or equation computes a value for each validation project that represents the success of each validation project meeting the requester's levels of importance. For instance, the eligible validation project may not have the highest quality as compared to the other validation projects, yet in combination with a cost and time that are low enough, the validation project can still be identified as the eligible validation project.

Having identified the eligible validation project, the method 300 selects two final control parameters. This is done via the select two final control parameters operation 312. In this operation 312 the values for the two validation control parameters of the eligible validation project are selected.

The method 300 then submits a final project to the online crowdsourcing system via the submit a final project to the online crowdsourcing system operation 314. The final project includes the two final control parameters. The number of HITs in the validation project is less than the number of HITs in the final project.

Figure 4:
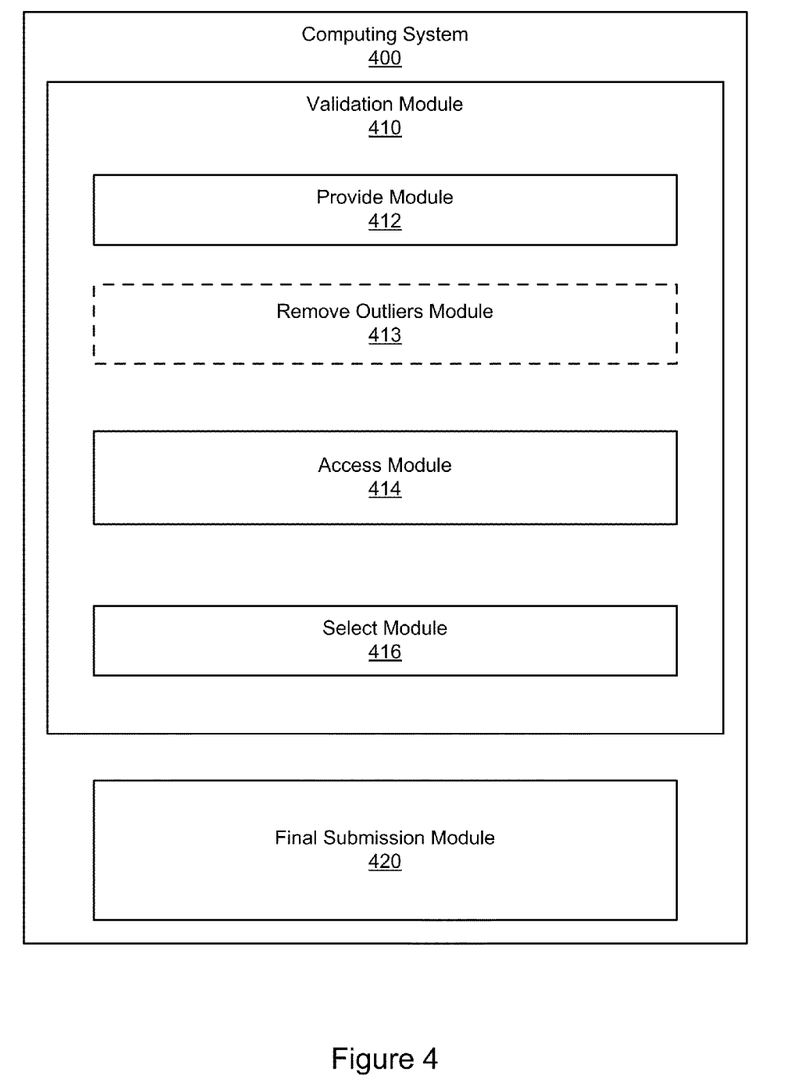
FIG. 4 illustrates an embodiment of a computing system that includes a validation module and a final submission module.

FIG. 4 illustrates an embodiment of a computing system 400 that includes a validation module 410 and a final submission module 420. The validation module 410 submits validation projects to an online crowdsourcing system to quickly and inexpensively select final control parameters to be submitted along with a final project to the online crowdsourcing system. Once final control parameters have been selected, the final submission module 420 submits a final project to the online crowdsourcing system using the final control parameters selected by the validation module 410.

In an embodiment, the validation module 410 includes a provide module 412, an access module 414, and a selection module 416. The provide module 412 is configured to provide one or more instances of a validation project to an online crowdsourcing system. The provide module 412 provides a single validation project (i.e., a single batch of tasks). However, each instance of the validation project is differentiated by having different values of the two validation control parameters: payment per HIT and number of solutions per HIT. For example, four instances of a validation project could have values of the two validation control parameters as follows: instance A pays $0.01 per HIT and requires five solutions per HIT; instance B pays $0.01 per HIT and requires five solutions per HIT; instance C pays $0.05 per HIT and requires five solutions per HIT; and instance D pays $0.05 per HIT and requires ten solutions per HIT. By submitting the same validation projects, but different instances having different combinations of values for the two control parameters, the validation module 410 is able to analyze changes in quality, cost, and time as values of the two validation control parameters are adjusted.

Online non-experts work on the instances of the validation project and return solutions to the HITs that make up the validation project. Once all solutions for an instance of the validation project have been completed, the instance of the validation project is called a completed instance of the validation project.

The validation module 410 also includes an access module 414 for accessing completed instances of the validation project. Access is performed through the online crowdsourcing system. In an embodiment, accessing means electronically probing stored data residing on a server, hard drive, or other computer readable medium, reading the stored data, or transferring the stored data to another computer readable medium for later reading and/or processing. The data includes or represents solutions. The data can be stored on a computer readable medium associated with the crowdsourcing system or stored on a computer readable medium associated with the requester.

In an embodiment, the computing system optionally includes a remove outliers module 413. Outliers are identified after online non-experts complete solutions to HITs or after the access module 412 accesses completed instances of the validation projects. Outlier detection can be done for both validation projects and final submission projects. Outliers, or outlier solutions, are those solutions having an agreement probability lower than an outlier threshold. The outlier threshold is an agreement probability that all solutions must attain in order to avoid being deemed outlier solutions. The outlier threshold could be 55%, or 60%, or 65%, or 70%, for example. The remove outliers module 413 removes outliers, rejects outliers, or denies access to outliers. Removing outliers means deleting them from a computer readable storage medium. Rejecting outliers means that the computing system 400 does not or cannot access them through the crowdsourcing system. In this case the crowdsourcing system can either block access to rejected outliers or delete rejected outliers from a computer readable storage medium. To deny access to outliers means that the computing system 400 rather than the crowdsourcing system blocks access to the outliers. In an embodiment, rather than just remove, reject, or deny access to outliers, all solutions provided by online non-experts who provided any outliers can be removed, rejected, or blocked. An online non-expert can even be precluded from any future work for a given requester. The remove outliers module 413 can also use an outlier algorithm, which was previously discussed in this disclosure.

Once the completed instances of the project have been accessed, the selection module 416 can select final control parameters. The final control parameters include a final payment per HIT and a number of solutions per HIT. One completed instance of the validation project has a combination of quality, cost, and time that meets a quality-cost-time algorithm. The values of the validation control parameters for this completed instance of the validation project are selected as the final control parameters. The quality-cost-time algorithm is an algorithm that compares a quality, cost, and time for each completed instance of the validation project, with values that a requester has assigned for quality, cost, and time. The values are assigned based on the importance of quality, cost, and time to the requester. For example, if quality is more important than cost, than the requester assigns quality a higher value than cost. In an embodiment, the quality-cost-time algorithm is a weighted sum of the quality, cost, and time. The weighted sum computes a weighted total for each completed instance of the validation project by performing a weighted sum or a weighted average of the quality, cost, and time for each completed instance of the validation project. The final control parameters are selected from the completed instance of the validation project having the highest weighted sum or the highest weighted average.

The final submission module 420 is configured to submit a final project to the online crowdsourcing system. The final project uses the final control parameters selected by the selection module 416.

In an embodiment, the validation project has a first number of HITs and the final project has as second number of HITs. The second number of HITs is greater than the first number of HITs.

In an embodiment, the validation module 410 is optionally configured to determine whether an online crowdsourcing system is the proper tool for completing the final project. To do this the validation module 410 compares solutions to effectiveness criteria to determine if the final project will meet goals of the requester. Effectiveness criteria are values or algorithms representing combinations of values for quality, cost, and time based upon a requester's inputs. The effectiveness criteria quantitatively represent the importance of quality, cost, and time to the requester. The validation module 410 compares a quality, cost, and time for the one of the completed instances of the validation project that meets the quality-cost-time algorithm to the effectiveness criteria. If the quality, cost, and time meet the effectiveness criteria, then the final project is submitted to the online crowdsourcing system. If the quality, cost, and time do not meet the effectiveness criteria, then the final project is not submitted to the online crowdsourcing system.

For the purposes of this disclosure a computer readable medium is a medium that stores computer data in a machine readable form. By way of example, and not limitation, a computer readable medium can include computer storage media as well as communication media, methods, or signals. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology; CD-ROM, DVD, or other optical storage; magnetic cassettes, magnetic disk storage, or other magnetic storage devices; or any other medium which can be used to tangibly store the desired information and which can be accessed by a computing system.

For the purposes of this disclosure, a "computer system" or "computing system" is a system or device inclusive of a processor and memory for storing and executing program code, data, and software. Memory is a form of computer readable medium including random access memory, read only memory, and dynamic random access memory, to name a few. Computing systems can be provided with operating systems that allow the execution of software application sin order to manipulate data. Computing systems can include input devices or input peripherals (e.g., keyboard, mouse, joystick, and microphone) and output device or output peripherals (e.g., monitor, display, printer, and speaker). Personal computers, PDA's, wireless devices, cell phones, internet appliances, media players, home theatre systems, and media centers are several non-limiting examples of computing systems.

For the purposes of this disclosure, a "processor" is a logic machine or a component of a computing system capable of executing computer programs or computer instructions.

For the purposes of this disclosure, a "module" is a software, hardware, or firmware (or combinations thereof) system, process of functionality, or component thereof, that performs or facilitates the processes, features, and/or functions described herein (with or without human interaction or augmentation). A module can include sub-modules.

Various implementations of the systems and methods described herein can be realized in digital electronic circuitry, integrated circuitry, specially designed ASICs (application-specific integrated circuits), computer hardware, firmware, software, and/or combinations thereof. These various implementations can include one or more computer programs that are executable and/or interpretable on a programmable system including at least one programmable processor, which can be special or general purpose, coupled to receive data and instructions from, and to transmit data and instructions to, a storage system, at least one input device, and at least one output device. Such computer programs (also known as programs, software, software applications or code) can include machine instructions for a programmable processor, and can be implemented in any form of programming language, including high-level procedural and/or object-oriented programming languages, and/or in assembly/machine languages. A computer program can be deployed in any form, including as a stand-alone program, or as a module, component, subroutine, or other unit suitable for use in a computing environment. A computer program can be deployed to be executed or interpreted on one computer or on multiple computers at one site, or distributed across multiple sites and interconnected by a communication network.

It is clear that many modifications and variations of this embodiment can be made by one skilled in the art without departing from the spirit of the novel art of this disclosure. For example, final control parameters could include values other than payment per HIT and number of solutions per HIT. These modifications and variations do not depart from the broader spirit and scope of the invention, and the examples cited here are to be regarded in an illustrative rather than a restrictive sense.

In the foregoing specification, the disclosure has been described with reference to specific exemplary embodiments thereof. It will be evident that various modifications can be made thereto without departing from the broader spirit and scope as set forth in the following claims. The specification and drawings are, accordingly, to be regarded in an illustrative sense rather than a restrictive sense.

What is claimed is:

1. A computing system comprising:
   one or more processors to execute instructions corresponding to one or more modules:
   one or more storage media coupled to the one or more processors to retain the instructions; and
   wherein the one or more modules comprises a validation module, the validation module comprising:
      a submit validation project sub module configured to submit validation projects to an online crowdsourcing system, wherein each validation project has one or more human intelligence tasks (HITs) and has two validation control parameters, wherein the two validation control parameters are:
         a payment per human intelligence task (HIT); and
         a number of solutions per HIT;
      a quality sub module configured to compute an agreement probability of each validation project, wherein the agreement probability is a percentage of solutions that match one or more references, and wherein the computing the agreement probability comprises:
         determining one or more sets of solutions that match one or more of the references; and
         comparing quantity information corresponding to the one or more sets of solutions to aggregate quantity information for solutions corresponding to the validation project;
      a cost sub module configured to compute a cost of each validation project;
      a time sub module configured to compute a time that each validation project takes to complete;
      a selection sub module configured to:
         identify an eligible validation project from the validation projects, wherein the eligible validation project meets a goal; and
         select two validation control parameters from the eligible validation project to be two final control parameters; and
      a submission module configured to submit a final project along with the two final control parameters to the online crowdsourcing system.

2. The computing system of claim 1, wherein the number of HITs in each validation project is less than the number of HITs in the final project.

3. The computing system of claim 1, wherein the references are solutions provided by one or more experts.

4. The computing system of claim 1, wherein the references are solutions provided by online non-experts.

5. The computing system of claim 1, wherein the references are solutions provided by one or more experts and online non-experts.

6. The computing system of claim 1, wherein each validation project comprises a different combination of the two validation control parameters.

7. The computing system of claim 1 further comprising a filter outlier sub module configured to remove outlier solutions, where outlier solutions produce an agreement probability lower than an outlier threshold.

8. The computing system of claim 1 wherein the goal is a quality-cost-time algorithm.

9. The computing system of claim 8, wherein the quality-cost-time algorithm is a weighted sum of quality, cost, and time.

10. A computer-implemented method comprising:
providing, by a computing device, first projects to an online crowdsourcing system to request solutions to the first projects from online human agents working for the online crowdsourcing system, wherein each project of the first projects has one or more human intelligence tasks (HITs) derived from a second project and is submitted to the online crowdsourcing system to request a first number of solutions per HIT at a price of a first payment per HIT;
determining, by the computing device, quality of the solutions to the first projects via computing percentages of the solutions that match one or more reference solutions, including determining one or more sets of solutions that match one or more of the reference solutions and comparing quantity information corresponding to the one or more sets of solutions to aggregate quantity information for solutions corresponding to the validation project;
computing, by the computing device, cost of the solutions to the first projects, including payments to human agents providing the solutions to the first projects via the online crowdsourcing system and time to obtain the solutions to the first projects;
selecting, by the computing device, a second number of solutions per HIT and a second payment per HIT for the second project, based the quality of the solutions to the first projects and the cost of the solutions to the first projects; and
submitting, by the computing device, the second project to the online crowdsourcing system to request solutions to the second project, wherein the second project includes a plurality of HITs and is submitted to the online crowdsourcing system to request the second number of solutions per HIT at a price of the second payment per HIT.

11. The computer-implemented method of claim 10, further comprising identifying outliers based on quality of solutions from the outliers and rejecting solutions from outliers.

12. The computer-implemented method of claim 11, wherein each of the outliers is an online non-expert of the online crowdsourcing system identified based on a distribution of agreement probability for solutions provided by the online non-expert.

13. The computer-implemented method of claim 11, wherein each of the outliers is an online non-expert that has an agreement probability that is lower than an outlier threshold.

14. The computer-implemented method of claim 10, wherein HITs in each of the first projects is a random sample of the HITs in the second project.

15. The computer-implemented method of claim 10, further comprising determining different combinations of the first number of solutions per HIT and the first payment per HIT for the first projects.

16. A computing system comprising:
one or more processors to execute instructions corresponding to one or more modules:
one or more storage media coupled to the one or more processors to retain the instructions; and
wherein the one or more modules comprises a validation module, the validation module comprising:
a provide module configured to provide one or more instances of a validation project to an online crowdsourcing system, each instance of the validation project comprising different values of the following validation control parameters:
payment per human intelligence task (HIT); and
number of solutions per HIT;
an access module configured to access completed instances of the validation project via the online crowdsourcing system;
a selection module configured to select final control parameters from one of the completed instances of the validation project, where the one of the completed instances of the validation project meets a quality-cost-time algorithm, wherein the quality-cost-time algorithm comprises:
comparing a quality indicator, a time indicator, and a cost indicator corresponding to the one of the completed instances of the validation project to a predetermined quality value, a predetermined time value, and a predetermined cost value, respectively; and
assigning a weighted value to the one of the completed instances of the validation project based at least in part on the quality indicator, the time indicator, and the cost indicator; and
a final submission module configured to submit a final project to the online crowdsourcing system, wherein the final project uses the final control parameters.

17. The computing system of claim 16, wherein the one or more instances of the validation project each comprise a first number of human intelligence tasks (HITs) and the final project comprises a second number of HITs, and the second number of HITs is greater than the first number of HITs.

18. The computing system of claim 16, wherein the final control parameters include:
a final payment per HIT; and
a final number of solutions per HIT.

19. The computing system of claim 16, further comprising a remove outliers module configured to remove solutions having an agreement probability that is lower than an outlier threshold.

20. The computing system of claim 16, further comprising submitting the final project to the online crowdsourcing system if a quality, cost, and time, for one of the completed instances of the validation project that meets the quality-cost-time algorithm, meets an effectiveness criteria.

* * * * *